(12) United States Patent
Lehnen et al.

(10) Patent No.: US 8,388,896 B2
(45) Date of Patent: Mar. 5, 2013

(54) EXHAUST GAS RETREATMENT DEVICE

(75) Inventors: Rainer Lehnen, Ebersbach (DE);
Rudolf Buhmann, Esslingen (DE);
Kresimir Jambrosic, Stuttgart (DE)

(73) Assignee: J. Eberspaecher GmbH & Co. KG,
Esslingen (DE)

( * ) Notice: Subject to any disclaimer, the term of this patent is extended or adjusted under 35 U.S.C. 154(b) by 425 days.

(21) Appl. No.: 12/553,614

(22) Filed: Sep. 3, 2009

(65) Prior Publication Data

US 2010/0061898 A1   Mar. 11, 2010

(30) Foreign Application Priority Data

Sep. 8, 2008 (DE) .......................... 10 2008 046 222

(51) Int. Cl.
*B01D 50/00* (2006.01)
(52) U.S. Cl. ....................................................... 422/168
(58) Field of Classification Search .................. 422/177, 422/180; 181/37, 249, 251
See application file for complete search history.

(56) References Cited

U.S. PATENT DOCUMENTS 5,746,986 A * 5/1998 Pollock et al. ................ 422/177
7,334,402 B2   2/2008 Hiraga

FOREIGN PATENT DOCUMENTS

| DE | 10 2005 025 045 A1 | 12/2006 |
| DE | 10 2007 010 486 A1 | 9/2008 |
| EP |      1 536 113 A2  | 6/2005 |

\* cited by examiner

*Primary Examiner* — Tom Duong
(74) *Attorney, Agent, or Firm* — Reinhart Boerner Van Deuren P.C.

(57) ABSTRACT

Provided is an exhaust gas retreatment device for an exhaust system of an internal combustion engine including a housing, in which an exhaust gas retreatment element and upstream thereof a silencer device are arranged, an inlet gas path leading from one housing inlet to an outlet of the exhaust gas retreatment element located in the interior of the housing, with an exhaust gas path following the inlet gas path which in the interior of the housing leads to the silencer device and/or through the silencer device as well as to a housing outlet. A cost-effective design can be achieved if the inlet gas path has a higher gas tightness than the exhaust gas path and/or if components of the exhaust gas retreatment device limiting the inlet gas path have a higher material quality than components of the exhaust gas retreatment device only limiting the exhaust gas path.

11 Claims, 4 Drawing Sheets

EXHAUST GAS RETREATMENT DEVICE

CROSS-REFERENCE TO RELATED PATENT APPLICATIONS

This patent application claims the benefit of co-pending German Patent Application No. DE 102008046222.5, filed on Sep. 8, 2008, the entire teachings and disclosure of which are incorporated herein by reference thereto.

FIELD OF THE INVENTION

The present invention relates to an exhaust gas retreatment device for an exhaust system of an internal combustion engine, more preferably a motor vehicle.

BACKGROUND OF THE INVENTION

An exhaust gas retreatment device of this type is known for example from DE 10 2005 025 045 A1 and comprises a housing in which at least one SCR catalytic converter element and downstream thereof at least one silencer device are arranged. Furthermore, an inlet gas path and an exhaust gas path following said inlet gas path are embodied in the housing. The inlet gas path leads from a housing inlet to an outlet of the at least one SCR catalytic converter element located in the interior of the housing. The exhaust gas path in the interior of the housing leads to the at least one silencer device and/or through the at least one silencer device as well as to a housing outlet.

By injecting a suitable reduction agent, more preferably ammonia or urea or a watery urea solution the respective SCR catalytic converter element brings about splitting of the nitric oxides into nitrogen and water. Exhaust gas retreatment devices of this type are characterized by a compact design and by an effective exhaust gas cleaning effect in view of the removal of nitric oxides from the exhaust gases. These devices are preferably used with diesel engines, more preferably with commercial vehicles. Through increasing environmental awareness the need for exhaust gas retreatment devices of this type increases continually.

BRIEF SUMMARY OF THE INVENTION

The present invention deals with the problem of stating an improved embodiment for an exhaust gas retreatment device of the type mentioned at the outset which is more preferably characterized by cost-effective producibility.

Embodiments of the invention are based on the general idea of configuring the exhaust gas retreatment device within the inlet gas path, more preferably with respect to tightness and/or material quality, with a higher valency than in the exhaust gas path. Embodiments of the invention thereby utilize the realization that increased gas tightness is only required up to the chemical retreatment of the exhaust gases or the exhaust gas constituents in the respective exhaust gas retreatment element, more preferably only up to the conversion of soot embedded in a particle filter into $CO_2$ or only up to the conversion of the nitric oxides in the SCR catalytic converter in order to be able to maintain the desired emission limit values. Furthermore, embodiments of the invention utilize the realization that materials of higher quality are more preferably only required up to the conversion of the nitric oxides in the SCR catalytic converter since a corrosion risk through exposure to urea or ammonia downstream of the SCR catalytic converter is considerably reduced. Through the construction of the exhaust gas retreatment device proposed according to the embodiments of the invention, it is possible to produce the exhaust gas retreatment device comparatively cost-effectively. On the one hand, with the construction according to the invention only a comparatively small part of the exhaust gas retreatment device consists of the inlet gas path so that the greatest part of the exhaust gas retreatment device can be produced with more cost-effective materials, more cost-effective manufacturing methods and cost-effective joining techniques.

According to an advantageous embodiment components limiting the inlet gas path can be joined with one another through material connection joints while components only limiting the exhaust gas path can be joined to one another through positive connection joints. Material connection joints such as for example welded joints and soldered joints have a significantly higher gas tightness than positive connection joints such as for example folded joints and flanged joints. In contrast with this positive connection joints can also be produced considerably more cost effectively than material connection joints.

With another advantageous embodiment the components limiting the inlet gas path can be produced from alloyed steels, while only the components limiting the exhaust gas path are manufactured of non-alloyed steels. Alloyed steels such as for example stainless steel for example have a higher corrosion resistance, more preferably to aggressive media such as urea and ammonia while non-alloyed steels such as for example black plate are considerably more cost effective.

It is to be understood that the features mentioned above and yet to be explained in the following cannot only be used in the respective combination stated but also in other combinations or standing alone without leaving the scope of the present invention.

BRIEF DESCRIPTION OF THE DRAWINGS

Preferred exemplary embodiments of the invention are shown in the drawings and are explained in more detail in the following description, wherein identical reference symbols refer to identical or similar or functionally identical components.

It shows, in each case schematically.

DETAILED DESCRIPTION OF THE INVENTION

Figure 1:
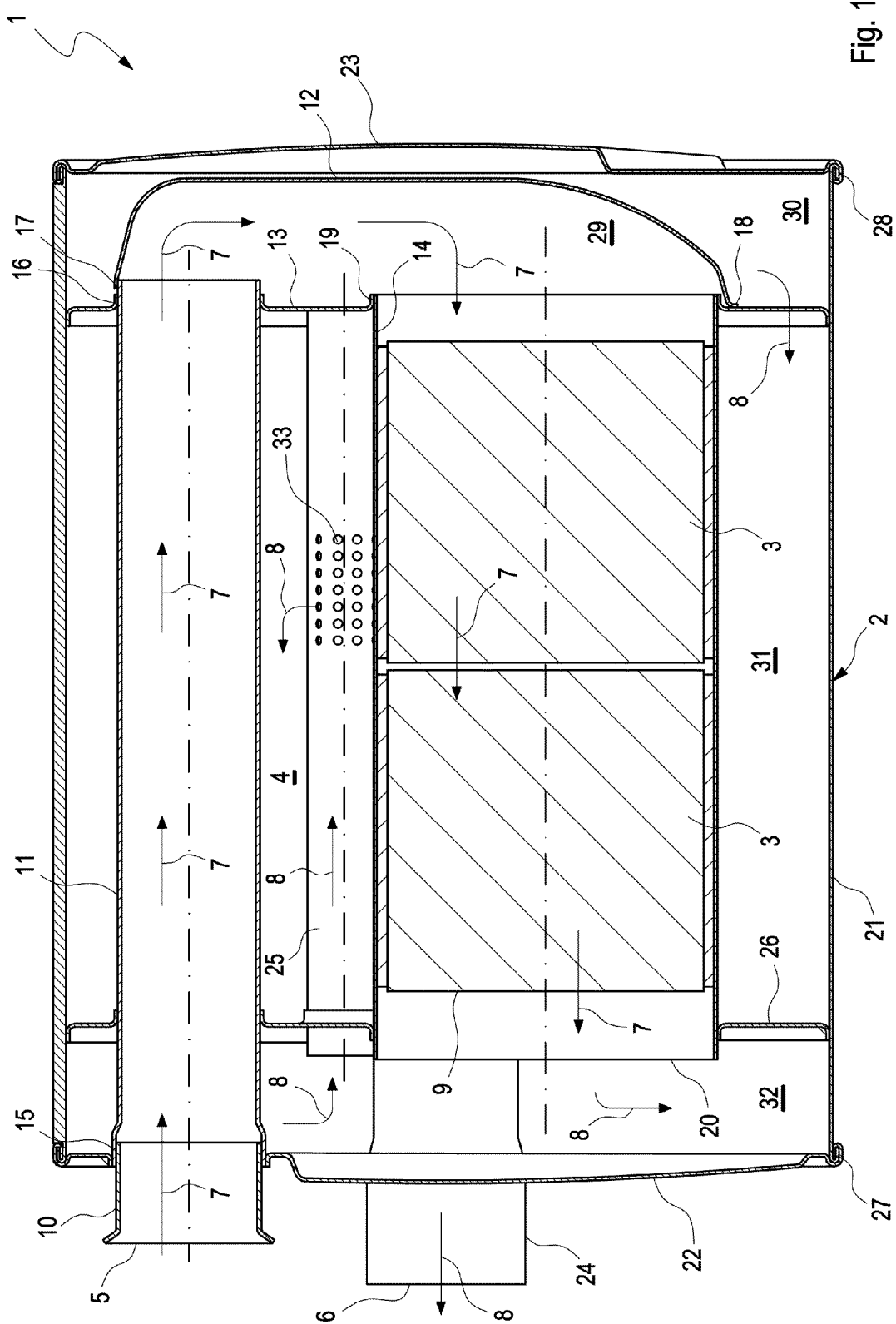
FIGS. 1 to 4 are each highly simplified elementary longitudinal sections through an exhaust gas retreatment device with various embodiments.

According to FIGS. 1 to 4, an exhaust gas retreatment device 1 comprises a housing 2 which comprises at least one exhaust gas retreatment element 3 and at least one silencer device 4. Here, the at least one silencer device 4 is arranged downstream of the at least one exhaust gas retreatment element 3. In the preferred example shown the respective exhaust gas retreatment element 3 is an SCR catalytic converter element which in the following is also designated 3. It can also be another exhaust gas retreatment element 3 such as a particle filter. In the examples shown, two SCR catalytic converter elements 3 each are arranged one after the other in a manner that allows flow-through. It is clear that more or fewer SCR catalytic converter elements 3 of this type can also be provided. With the help of the respective SCR catalytic converter element 3, nitric oxides carried along in the exhaust gas can be converted into water and nitrogen with the help of a suitable reduction agent admixed to the exhaust gas flow, which reduction agent can be ammonia or urea or a watery urea solution. Here, the ammonia or the urea is fed in via a suitable dosing device which in an exhaust system can be arranged upstream of the exhaust gas retreatment device 1. The dosing device is practically arranged at the start of a mixing section integrated in the exhaust gas retreatment system which ensures optimum intermixing and evaporation of the urea water solution with the exhaust gas. It is likewise possible to integrate such a metering device in the exhaust gas retreatment device 1. The at least one silencer device 4 with the embodiments shown comprises a suitable quantity of cross-sectional jumps, expansion spaces, absorption materials, resonance spaces, in each case cumulative or alternative and also in any combination. The at least one silencer device 4 is designed with regard to the frequencies to be dampened. The exhaust gas retreatment device 1 is suitable for use in an exhaust system of an internal combustion engine which in turn is preferably arranged in a motor vehicle, more preferably in a commercial vehicle.

The exhaust gas retreatment device 1 or its housing 2 comprises a housing inlet 5 through which exhaust gas enters the housing 2 and a housing outlet 6 through which exhaust gas exits the housing 2. In the housing 2 are formed an inlet gas path 7 and an exhaust gas path 8. The inlet gas path 7 is represented by arrows and leads from the housing inlet 5 up to an outlet 9 of the respective exhaust gas retreatment element 3 which is located in the interior of the housing 2. The exhaust gas path 8 is likewise represented by arrows and leads in the interior of the housing 2 to the at least one silencer device 4 or through the at least one silencer device 4 up to the housing outlet 6. Here, the exhaust gas path 8 follows the inlet gas path 7 downstream. In the example shown, the exhaust gas path 8 immediately follows the inlet gas path 7 so that the two gas paths 7, 8 in the example follow each other. Insofar as the exhaust gas retreatment device 1 contains additional, other exhaust gas treatment elements, such as for example an oxidation catalytic converter and/or a particle filter, these elements can be arranged upstream of the at least one SCR element 3 so that these then belong to the inlet gas path 7. Insofar as these are arranged downstream of the at least one SCR element 3 however, these can still belong to the inlet gas path 7 or already belong to the exhaust gas path 8 or be positioned between the two gas paths 7, 8 so that they neither belong to the inlet gas path 7 nor to the exhaust gas path 8.

The inlet gas path 7 differs from the exhaust gas path 8 in that the inlet gas path 7 has greater gas tightness than the exhaust gas path 8. In addition or alternatively, the inlet gas path 7 differs from the exhaust gas path 8 in that the components limiting the inlet gas path 7 have a higher material quality than components only limiting the exhaust gas path 8. This design takes into account that the greater gas tightness with the embodiments shown here, wherein the exhaust gas retreatment device 1 for the chemical exhaust gas treatment exclusively comprises the at least 1 SCR catalytic converter element 3, is only required for as long as untreated exhaust gases are present. This is substantially only the case up to the outlet 9. The SCR catalytic converter elements 3 are practically designed so that with normal, regular operation no nitric oxides or only a tolerable quantity of nitric oxides are contained in the exhaust flow exiting from the outlet 9. Downstream of the inlet gas path 7 optimum gas tightness of the exhaust gas retreatment device 1 is no longer an issue since the chemical exhaust gas treatment is completed upstream of the SCR catalytic converter element 3. The gas tightness required in the exhaust gas path 8 consequently merely has to meet far lower requirements since only flow conduction and sound conduction have to be substantially effected.

Increased gas tightness can be realized for example in that the components of the exhaust gas retreatment device 1 which limit the inlet gas path 7 are connected with one another through material connection joints. Components limiting the inlet gas path 7 are for example an inlet socket 10, an inlet pipe 11, a shell body 12, an intermediate floor 13 and a receiving pipe 14. Material connection joints, i.e. more preferably welded joints and soldered joints are then formed at 15 between the inlet socket 10 and the inlet pipe 11, at 16 between the inlet pipe 11 and the intermediate floor 13, at 17 between the shell body 12 and the inlet pipe 11, at 18 between the shell body 12 and the intermediate floor 13 and at 19 between the receiving pipe 14 and the intermediate floor 13. Because of this, the inlet gas path 7 from the housing inlet 5 to the outlet end 20 of the receiving pipe 14 is gas tight with high quality. In contrast with this, components of the exhaust gas retreatment device 1, which only limit the exhaust gas path 8, are preferentially connected with one another through positive connection joints. Components of this type which only limit the exhaust gas path 8 are for example a jacket 21 of the housing 2, axial end bases 22, 23, an outlet socket 24 or an outlet pipe 24 as well as various connecting pipes 25 and additional intermediate floors 26. Positive connection joints such as for example folded joints or flanged joints are for example provided at 27 between the jacket 21 and the one end base 22 and at 28 between the jackets 21 and the other end base 23. Positioning and if applicable holding of the other intermediate floors 26 and the connecting pipes 27 as well as the outlet pipe 24 can be realized through plug connections with force fit and through sliding fits. While with the components of the inlet gas path 7 all joints are practically designed as material connection joints it is not required with the components of the exhaust gas path 8 to design all connections as positive connection joints. More preferably, individual components in the exhaust gas path 8 can also be connected with one another through material connection joints, for example soldered joints.

The components limiting the inlet gas path 7, i.e. more preferably the inlet socket 10, the inlet pipe 11, the shell body 12, the intermediate floor 13 and the receiving pipe 14 can preferentially be produced from alloyed steel, more preferably stainless steel, as a result of which these components and the inlet gas path 7 are corrosion-resistant and resistant to aggressive media such as ammonia and urea and watery urea solution. In contrast with this the components only limiting the exhaust gas path 8, i.e. more preferably all other components of the exhaust gas retreatment device 1, such as for example the jacket 21, the end bases 22, 23, the outlet pipe 24, the connecting pipes 25 and the additional intermediate floors 26 consist of non-alloyed steels such as for example black plate. As a result, these components can be realized comparatively cost-effectively.

The inlet gas path 7 is practically arranged within the housing 2 so that it is at least partially, or as in the shown examples, completely arranged within the exhaust gas of the exhaust gas path 8. The inlet gas path 7 thus runs completely or at least partially within the outlet gas path 8 and/or within the at least one silencer device 4. In this manner the inlet gas path 7 is more or less enclosed by the exhaust gas path 8 and/or by the at least one silencer device 4.

Figure 4:
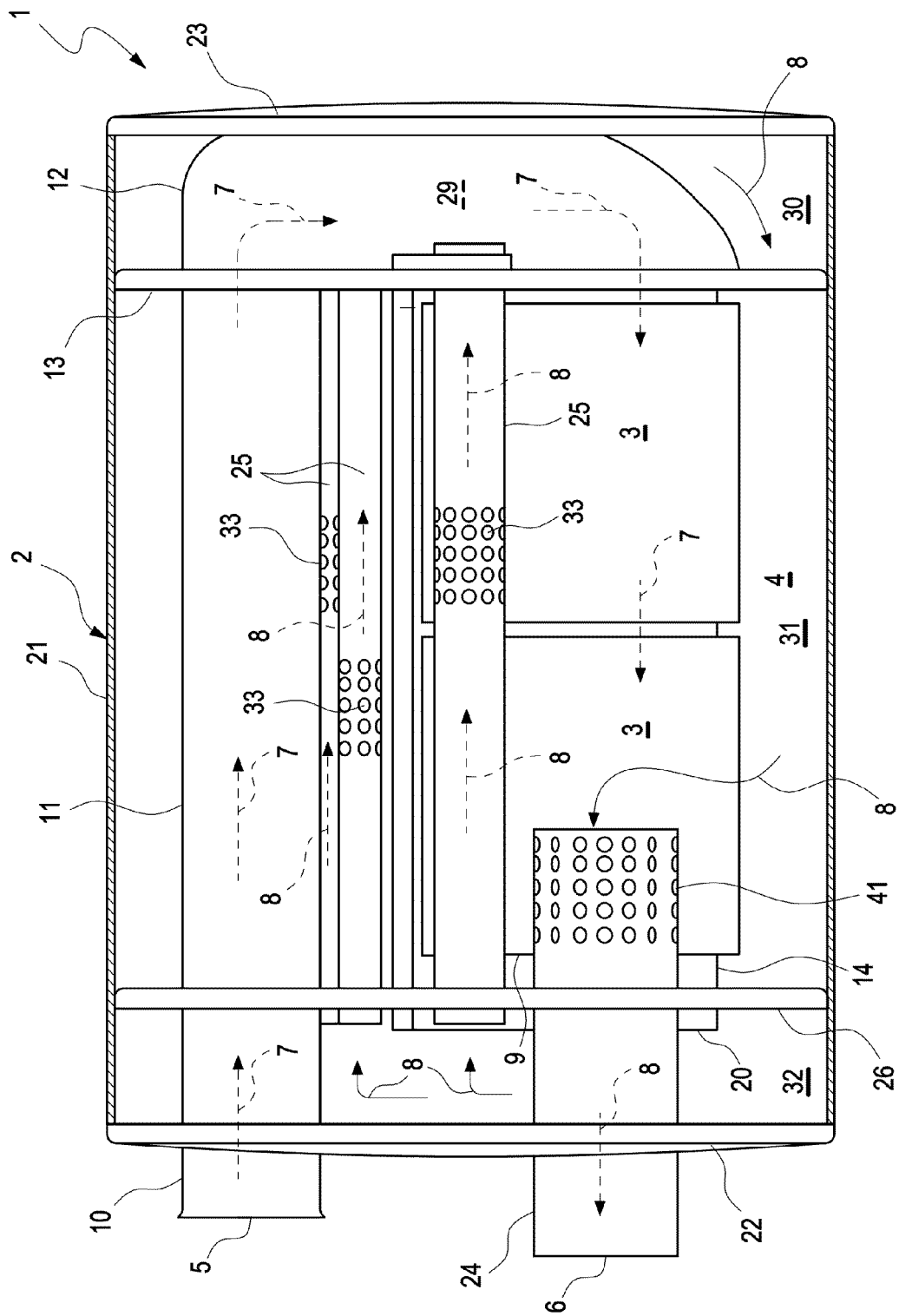

As already explained further up, the inlet gas path 7 comprises at least the inlet pipe 11, a deflection chamber 29 and the receiving pipe 14. The inlet pipe 11 connects the deflection chamber 29 with the housing inlet 5. In the example of FIG. 4 this is effected via the inlet socket 10 on which the housing inlet 5 is formed. The deflection chamber 29 connects the inlet pipe 11 with the receiving pipe 14. This contains the at least one SCR catalytic converter element 3 and comprises the outlet 9. The deflection chamber 29 is limited by the shell body 12 and by the intermediate floor 13. Here, the shell body 12 is fastened to the intermediate floor 13. The intermediate floor 13 in turn is supported on the jacket 21. The inlet pipe 11 and the receiving pipe 14 penetrate the intermediate floor 13 in corresponding openings which are not designated in more detail and are permanently connected with the intermediate floor 13. The deflection chamber 29 in the embodiments shown here is arranged within a chamber 30 of the housing 2 which belongs to the exhaust gas path 8 and/or to the at least one silencer device 4.

With the embodiment shown in FIG. 1, the housing 2 altogether contains three chambers, namely the previously mentioned chamber 30, which in the following is also designated first chamber 30, a second chamber 31 separated from the first chamber 30 through the intermediate floor 13 and a third chamber 32 separated from the second chamber 31 through the intermediate floor 26. The first chamber 30 is limited by the intermediate floor 13 and the second end base 23. The second chamber 31 is limited by the intermediate floor 13 and the intermediate base 26. The third chamber 32 is limited by the intermediate floor 26 and the first end base 22. The exhaust gas path 8 with this embodiment starts in the third chamber 32 and leads through connecting pipes 25 into the first chamber 30. In the process, the connecting pipes 25 traverse the second chamber 31. The outlet pipe 24 can start in the first chamber 30. In this case the intermediate floor 13 does not require any perforation. The second chamber 31 serves as reflection chamber. The connecting pipes 25 within the second chamber 31 can have a suitable perforation 33. Provided that the outlet pipe 24 starts in the second chamber 31, the exhaust gas also flows through the perforation 33 directly into the second chamber 31. The intermediate floor 13 can likewise be perforated so that exhaust gas reaches the second chamber 31 also from the first chamber 30.

Figure 2:
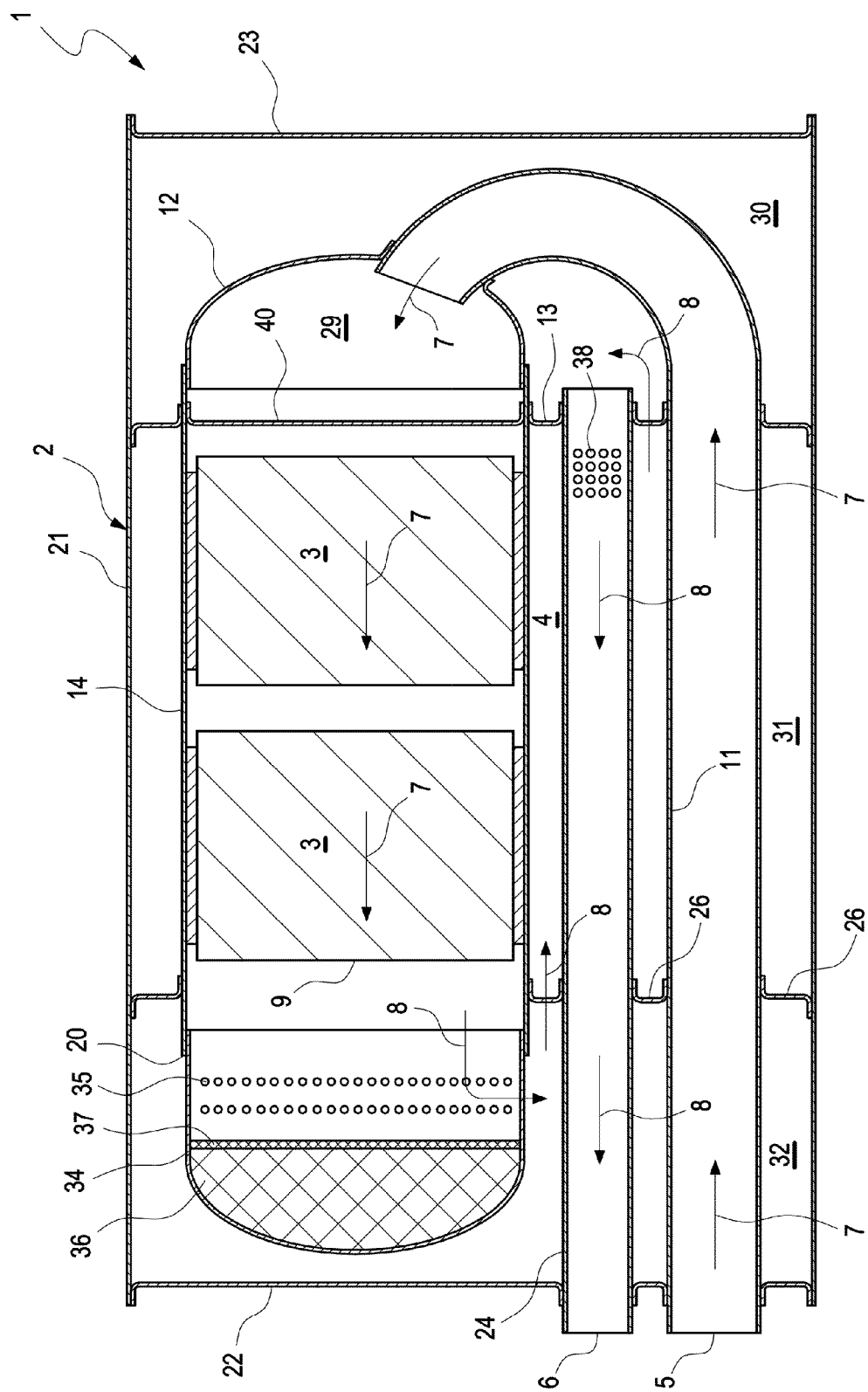

With the embodiment shown in FIG. 2, the receiving pipe 14 is closed with a cap 34 at its outlet end 20. The cap 34 in this case is provided with a perforation 35 and contains sound absorption material 36 which is positioned and fixed with a suitable sound-permeable holding structure 37. Here, the cap can already consist of non-alloyed steel. Furthermore, the joint formed between the receiving pipe 14 and the cap 34 need not be a material connection joint. With the embodiment shown in FIG. 2, the exhaust gas path 8 starts in the cap 34, leads through the perforation 35 of said cap into the third chamber 32, from there through the perforated intermediate floor 26 into the second chamber 31 and from there through the perforated intermediate floor 13 into the first chamber 30. From the first chamber 30 the exhaust gas reaches the housing outlet 6 through the outlet pipe 24. The outlet pipe 24 in this case is provided with a perforation 38, as a result of which acoustic coupling with the second space 31 is effected. Furthermore, exhaust gas can also reach the outlet pipe 24 through this perforation 38 directly from the second chamber 31. With the embodiment shown in FIG. 2 the shell body 12 for limiting the deflection chamber 29 is not fastened to the intermediate floor 13, but directly to the receiving pipe 14. Accordingly, the intermediate floor with this embodiment does not form a limitation of the inlet gas path 7 and need not therefore be manufactured of a higher-quality material. In the example shown the deflection chamber 29 is limited within the catalytic converter pipe 14 through a reinforcement floor 40 which is perforated. The reinforcement floor 40 brings about intensive stiffening of the catalytic converter pipe 14 and through its perforation, homogenization of the exhaust gas flow pipe to its entry in the receiving pipe 14.

Figure 3:
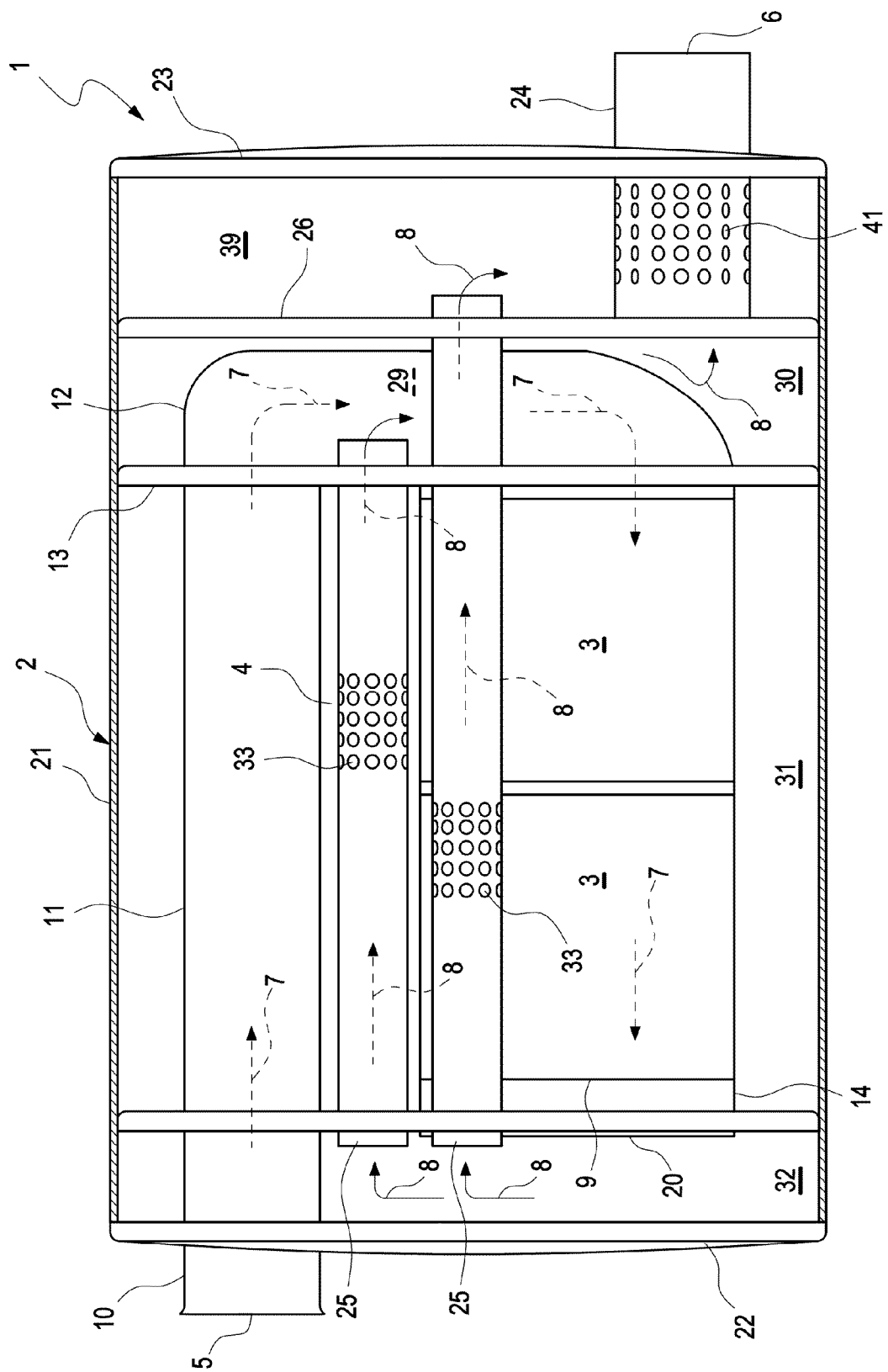

With the embodiment shown in FIG. 3, the housing 2 contains a fourth chamber 39 which in this case is limited by the second end base 23 and a further intermediate floor 26. The first chamber 30 in this case is limited by the intermediate floors 13 and 26. The exhaust gas path 8 with the embodiment shown in FIG. 3 runs as follows: from the third chamber 32 a part of the exhaust gas directly reaches the fourth chamber 39 through at least one longer connecting pipe 25 penetrating the first chamber 30 and from said fourth chamber via a perforation 41 radially into the outlet pipe 24 or into the outlet socket 24. The remaining part of the exhaust gas reaches the first chamber 30 from the third chamber 32 via at least one shorter connecting pipe 25 ending in the first chamber 30 and from there axially into the outlet pipe 24. The connecting pipes 25 are again perforated (33), as a result of which the second chamber 31 is able to produce its sound-dampening effect.

With the embodiment shown in FIG. 4, only three chambers 30, 31, 32 are again provided. The exhaust gas follows the exhaust gas path 8 from the third chamber 32 through the connecting pipes 25 into the first chamber 30. Through suitable perforation of the intermediate floor 13 the exhaust gases reach the second chamber 31 and from there the outlet pipe 24.

What is claimed is:

1. An exhaust gas retreatment device for an exhaust system of an internal combustion engine, comprising:
    a housing, in which at least one exhaust gas retreatment element and downstream thereof at least one silencer device are arranged;
    an inlet gas path, which leads from at least one housing inlet to an outlet of the exhaust gas retreatment element located in the interior of the housing,
    an exhaust gas path following the inlet gas path, which in the interior of the housing leads to the at least one silencer device and/or through the at least one silencer device as well as to a housing outlet;
    wherein the inlet gas path has greater gas tightness than the exhaust gas path, and/or
    wherein components of the exhaust gas retreatment device limiting the inlet gas path have a higher material quality than components of the exhaust gas retreatment device only limiting the exhaust gas path.

2. The exhaust gas retreatment device according to claim 1, wherein
    components of the exhaust gas retreatment device limiting the inlet gas path are joined with one another through material connection joints,
    wherein components of the exhaust gas retreatment device, which only limit the exhaust gas path are joined with one another through positive connection joints.

3. The exhaust gas retreatment device according to claim 2, wherein components of the exhaust gas retreatment device which limit the inlet gas path are produced of alloyed steel for example stainless steel, while components of the exhaust gas retreatment device which only limit the exhaust gas path are produced of non-alloyed steel.

4. The exhaust gas retreatment device according claim 3, wherein the inlet gas path in the interior of the housing runs completely or at least partially within the exhaust gas path and/or within the at least one silencer device and/or is enclosed by the exhaust gas path and/or by the at least one silencer device.

5. The exhaust gas retreatment device of claim 2, wherein the material connection joints are at least one of welded connections and soldered connections, and wherein the positive connection joints are at least one of folded joints and flanged joints.

6. The exhaust gas retreatment device of claim 3, wherein the non-alloyed steel is black plate.

7. The exhaust gas retreatment device according to claim 1, wherein the inlet gas path comprises an inlet pipe, a deflection chamber and a receiving pipe, wherein the inlet pipe fluidically joins the housing inlet with the deflection chamber, the deflection chamber fluidically joins the inlet pipe with the receiving pipe and the receiving pipe contains the at least one exhaust gas retreatment element and comprises the outlet.

8. The exhaust gas retreatment device according to claim 7, wherein the deflection chamber is limited by an intermediate floor of the housing and a shell body fastened to the intermediate floor or limited by the receiving pipe and a shell body fastened to the receiving pipe.

9. The exhaust gas retreatment device according to claim 8, wherein the deflection chamber is arranged within another chamber of the housing belonging to the exhaust gas path and/or to the at least one silencer device.

10. An exhaust gas retreatment device for an exhaust system of an internal combustion engine, comprising:
- a housing, in which at least one exhaust gas retreatment element and downstream thereof at least one silencer device are arranged;
- an inlet gas path, which leads from at least one housing inlet to an outlet of the exhaust gas retreatment element located in the interior of the housing,
- an exhaust gas path following the inlet gas path, which in the interior of the housing leads to the at least one silencer device and/or through the at least one silencer device as well as to a housing outlet;
- wherein the inlet gas path has greater gas tightness than the exhaust gas path, and/or
- wherein components of the exhaust gas retreatment device limiting the inlet gas path have a higher material quality than components of the exhaust gas retreatment device only limiting the exhaust gas path;
- wherein the inlet gas path comprises an inlet pipe, a deflection chamber and a receiving pipe, wherein the inlet pipe fluidically joins the housing inlet with the deflection chamber, the deflection chamber fluidically joins the inlet pipe with the receiving pipe and the receiving pipe contains the at least one exhaust gas retreatment element and comprises the outlet;
- wherein the deflection chamber is limited by an intermediate floor of the housing and a shell body fastened to the intermediate floor or limited by the receiving pipe and a shell body fastened to the receiving pipe;
- wherein the deflection chamber is arranged within another chamber of the housing belonging to the exhaust gas path and/or to the at least one silencer device; and
- wherein the receiving pipe is closed with a perforated cap which contains sound absorption material.

11. The exhaust gas retreatment device according to claim 1, wherein, the exhaust gas retreatment element is an SCR catalytic converter element or a particle filter element.

* * * * *